US012742848B2

(12) United States Patent
Chatham et al.

(10) Patent No.: US 12,742,848 B2
(45) Date of Patent: Sep. 22, 2026

(54) BEACON-BASED LOCATION DETECTION

(71) Applicant: Hoffmann-La Roche Inc., Little Falls, NJ (US)

(72) Inventors: Christopher Hughes Chatham, San Francisco, CA (US); Joerg Felix Hipp, Lörrach (DE); Lito Kriara, Zurich (CH); Michael Lindemann, Schopfheim (DE); Florian Lipsmeier, Basel (CH); David Nobbs, Basel (CH); David Alexander Slater, Basel (CH)

(73) Assignee: Hoffmann-La Roche Inc., Little Falls, NJ (US)

( * ) Notice: Subject to any disclaimer, the term of this patent is extended or adjusted under 35 U.S.C. 154(b) by 709 days.

(21) Appl. No.: 18/344,444

(22) Filed: Jun. 29, 2023

(65) Prior Publication Data

US 2024/0004021 A1 Jan. 4, 2024

Related U.S. Application Data

(63) Continuation of application No. PCT/EP2022/050003, filed on Jan. 3, 2022.

(60) Provisional application No. 63/133,508, filed on Jan. 4, 2021.

(51) Int. Cl.
*G01S 5/02* (2010.01)

(52) U.S. Cl.
CPC ......... *G01S 5/0231* (2013.01); *G01S 2205/02* (2020.05)

(58) Field of Classification Search
CPC ... A61B 5/1113; A61B 5/681; A61B 2505/07; G16H 40/20; G01S 1/042; G01S 5/0269; G01S 5/0231; G01S 5/0268; G01S 1/024; G01S 2205/10; G01S 2205/02
USPC ......... 455/456.1, 456.2, 456.3, 456.5, 456.6, 455/457
See application file for complete search history.

(56) References Cited

U.S. PATENT DOCUMENTS

| | | | | |
|---|---|---|---|---|
| 10,321,265 | B2 * | 6/2019 | Gerken, III | H04W 40/244 |
| 2018/0063676 | A1 * | 3/2018 | Mycek | H04W 4/021 |
| 2024/0062887 | A1 * | 2/2024 | Higginson | G16H 40/40 |

FOREIGN PATENT DOCUMENTS

| | | | | |
|---|---|---|---|---|
| CN | 109151781 A * | 1/2019 | | H04W 64/00 |
| CN | 111568427 A * | 8/2020 | | G01C 21/18 |
| WO | WO-2016036076 A2 * | 3/2016 | | H04W 4/029 |

OTHER PUBLICATIONS

Biehl, J., et al., "Achieving Accurate Room-Level Indoor Location Estimation with Emerging IoT Networks" ACM Digital Library 4:1-8 (Oct. 22, 2019).

Centorrino, P., et al., "Managing Crowded Museums: Visitors Flow Measurement, Analysis, Modeling, and Optimization" arxiv.org Physics-Cornell UNIV:1-31 (Jun. 30, 2020) https://arxiv.org/abs/2006.16830v1.

Della-Rosa, F. et al., "Ad-hoc networks aiding indoor calibrations of heterogeneous devices for Fingerprinting applications" Other 2010 Intl. Conference on Indoor Positioning and Indoor Navigation,, Zurich, Switzerland, pp. 1-6 ( Sep. 15, 2010).

(Continued)

*Primary Examiner* — David Q Nguyen
(74) *Attorney, Agent, or Firm* — Andrew Whitehead

(57) ABSTRACT

Methods and systems for determining a location of an individual in a home, business, structure, or other finite amount of space using one or more beacons.

15 Claims, 11 Drawing Sheets

(56) References Cited

OTHER PUBLICATIONS

"International Preliminary Report on Patentability—PCT/EP2022/050003" (Report Issuance Date: Jul. 4, 2023; Chapter I), :pp. 1-12 (Jul. 13, 2023).

"International Search Report—PCT/EP2022/050003" (w/Written Opinion), :pp. 1-15 (Apr. 5, 2022).

Kabelac, Z., et al., "Passive Monitoring at Home: A Pilot Study in Parkinson Disease" Digit Biomark 3(1):22-30 (Apr. 30, 2019).

Sridharan, M., et al., "Inferring Micro-Activities Using Wearable Sensing for ADL Recognition of Home-Care Patients" IEEE J Biomed Health Inform 24(3):747-759 (Mar. 1, 2020).

Surian, D., et al., "Tracking a moving user in indoor environments using Bluetooth low energy beacons" J Biomed Inform 98:103288 (1-9) (Oct. 1, 2019).

You, Y., et al., "Indoor Positioning System With Cellular Network Assistance Based on Received Signal Strength Indication of Beacon" IEEE Access 8(30):6691-6703 (Dec. 1, 2019).

* cited by examiner

BEACON-BASED LOCATION DETECTION

CROSS-REFERENCE TO RELATED APPLICATIONS

This application is a Continuation of International Patent Application No. PCT/EP2022/050003, filed Jan. 3, 2022, which claims benefit of priority to U.S. Provisional Application No. 63/133,508, filed Jan. 4, 2021, each of which is incorporated herein by reference in its entirety.

FIELD

Aspects described herein generally relate to location detection. More specifically, aspects provide methods and systems for determining a location of an individual in a home, business, structure, or other finite amount of space using one or more beacons.

BACKGROUND

Autism spectrum disorder (ASD) is a highly prevalent neurodevelopmental disorder estimated to affect 1 in 88 children in the United States. The core symptoms of autism include social communication deficits and restricted and repetitive behaviors. Current standards in assessing sociability in the context of clinical studies of ASD are based on clinician, caregiver and patient reported outcomes collected during clinical visits, such as the Vineland Adaptive Behavior Scales and Social Responsiveness Scale (VABS-III), Social Responsiveness Scale (SRS), Repetitive Behaviors Scale—Revised (RBS-R). Common problems with these tools include recall bias, poor inter/intra rater reliability, poor sensitivity to change, patient burden and lack of ecological validity. These measurement problems may be hindering the development of new treatments. In particular, subjective reporting may be associated with placebo responses that could mask treatment-related improvement.

Digital health technology tools may allow one to characterize different aspects of sociability during a participant's daily life with objective, high-frequency measurements that may be more reliable, lower burden and more sensitive to change than the participant's clinical measures and patient reported outcomes collected in the few clinical visits throughout a clinical trial. For example, in the outdoor environment, GPS can be used to identify time spent in "social places" and Bluetooth can be used to infer physical proximity of people. In the home environment, sociability may be characterized using WiFi, cameras using computer vision, Bluetooth, or combinations of multiple sensors such as RFID and cameras. Each technology comes with different challenges. Firstly, cameras require an approach that preserves patient privacy, whereas RFID/WiFi-based systems usually record the presence of a mobile sensor in relation to the different static RFID or WiFi devices, increasing the system complexity of retrieving and combining the information from all devices for analysis.

Kabelac et al.[1] presented prior relevant work in the context of clinical trials and healthcare, showing the potential of a specialized hardware device that can perform passive monitoring in one room at a time. The device used in this study was transmitting ultra-low-power radio signals that reflect off individuals within a range, and could very accurately track one person in the room and their activities. However, this approach required information about each room and even the location of furniture. Moreover, it would be particularly challenging to monitor one study participant when multiple people are in the room, and even harder to monitor the participants continuously as they move from one room to another, both of which comprise key aspects of sociability within the home.

Bluetooth low energy (BLE) beacons, known mainly for applications in marketing, entertainment, airports, museums or hospitals do not have any of these constraints of the previously mentioned technologies. BLE beacons transmit signals that can be recorded by one mobile sensor (e.g., a smartwatch), avoiding the need to combine data recorded at multiple sources and do not transmit any personally identifiable data.

Known approaches use the number of signals from BLE beacons to detect the user's room location. Surian et al.[2], performed two user experiments in an office and in a hospital, with the beacon-wearing user walking from one location to another based on a pre-defined route. They reported the accuracy of their proposed system in two test runs with an average of approximately 81.5%. However, a home setting is a much more challenging dynamic environment compared to a shopping/entertainment center, given the smaller spaces, furniture placement, and variety of building materials used. Different homes have different layouts (e.g. very small rooms or open spaces), different materials used for the walls and furniture that have a different impact on the BLE beacon signal. Thin wooden walls introduce very low signal attenuation relative to a concrete wall, making the signal strength of neighboring rooms very similar. It is therefore difficult to differentiate the dominant BLE signal and identify the current room the person is in. Additionally, metallic furniture/materials can increase signal reflection introducing error in the room estimation. Finally, the placement of the beacon in the room, e.g. centrally, by external walls or shared walls, can affect the signal accuracy.

Regarding the data processing, there is a considerable amount of prior work focusing on using calibration or training data. Such approaches fail to adapt in dynamic environments, requiring new rounds of strenuous calibration that non-technical people cannot easily perform.

Thus there is a need for systems and methods for accurate in-home room tracking, as independent as possible from the home layout and materials, which do not rely on any technical assistance or calibration/training data collection.

BIBLIOGRAPHY

[1] Kabelac Z. et al, Passive Monitoring at Home: A Pilot Study in Parkinson Disease, Digit Biomark. 2019 Apr. 30; 3(1):22-30.

[2] Surian D. et al, Tracking a moving user in indoor environments using Bluetooth low energy beacons. J Biomed Inform. 2019 October; 98:103288.

BRIEF SUMMARY

A solution is described using BLE beacons and the feasibility of performing in-home room tracking (i.e. identify the room the person is in) is evaluated in the context of a clinical trial. The present invention pertains to in-home room tracking and comprises a system based on BLE-beacon technology paired with a smartwatch combined with an algorithm to process the signals.

Firstly, the evaluation of the proposed solution and algorithm was performed in a home setting. A home setting is a much more challenging dynamic environment compared to a shopping/entertainment center, given the smaller spaces, furniture placement, and variety of building materials used. Different homes have different layouts (e.g., very small rooms or open spaces), different materials used for the walls and furniture that have a different impact on the BLE beacon signal. Thin wooden walls introduce very low signal attenuation relative to a concrete wall, making the signal strength of neighboring rooms very similar. It is therefore difficult to differentiate the dominant BLE signal and identify the current room the person is. Finally, metallic furniture/materials can increase signal reflection introducing error again in the room estimation.

The present invention is described in the context of a clinical trial for patients with ASD. It has been found feasible for study participants to set up the technology without any technical assistance. By visualizing examples of study participant's behavior pattern over a week, it has been demonstrated that the present invention applied for in-home room tracking can provide valuable insights into the everyday life of people with ASD. Finally, the experience and insights matured in this clinical trial are compiled in a list of good practice guidelines for using BLE beacons for indoor tracking.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

The terms "receiving device", "wearable" and "smartwatch" can herein be used interchangeably, without in any way limiting the present invention to specific embodiments. The terms "transmitting device", "beacon" and "beacon sensor" assume herein the same role. The terms "signal" and "beacon signal" are herein used interchangeably.

Figure 1:
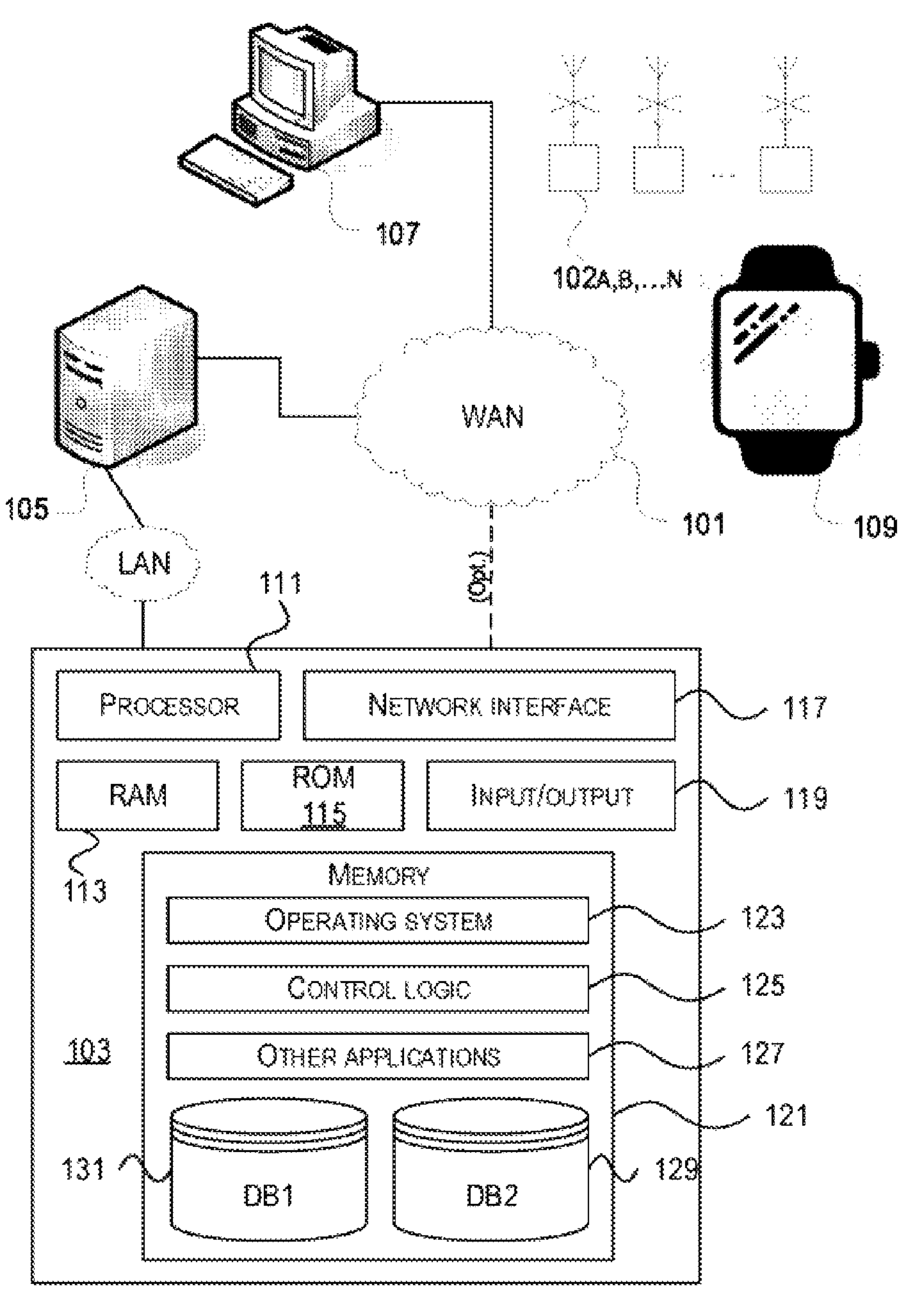
FIG. 1 illustrates a network and computer architecture that may be used to implement one or more illustrative aspects described herein.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cables, fiber optics, radio waves or other communication media. One or more beacons 102*a-n* may be used to communicate with and/or transmit a signal detectable by watch 109, as further described herein.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.). Device 109 is preferably a wearable device to be worn by a user/patient as further described herein.

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figure 2:
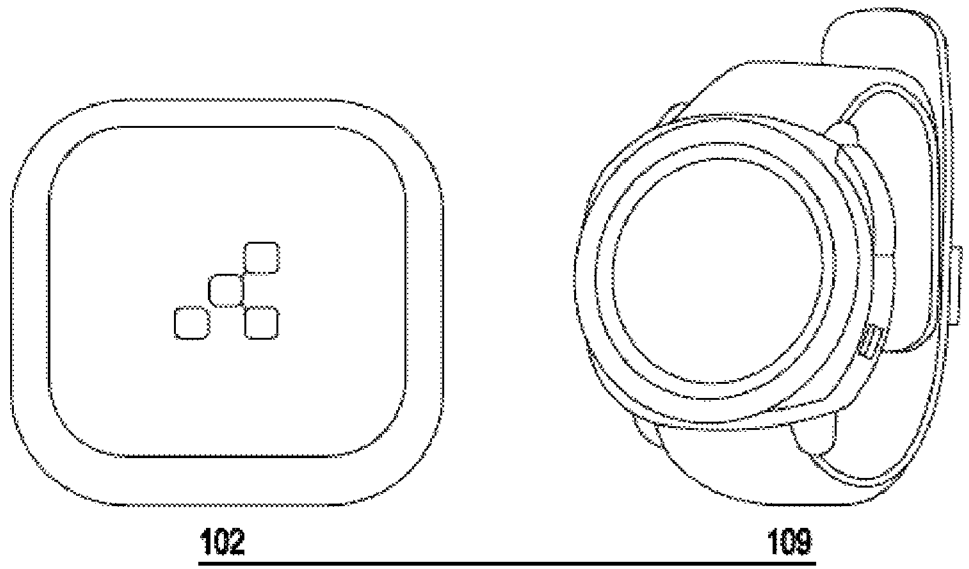
FIG. 2 illustrates BLE beacons (kontakt.io smart Beacon) deployed in each room and the users' Samsung Gear Sport smartwatch for in-home room monitoring, according to one or more illustrative aspects described herein.
Figure 3:
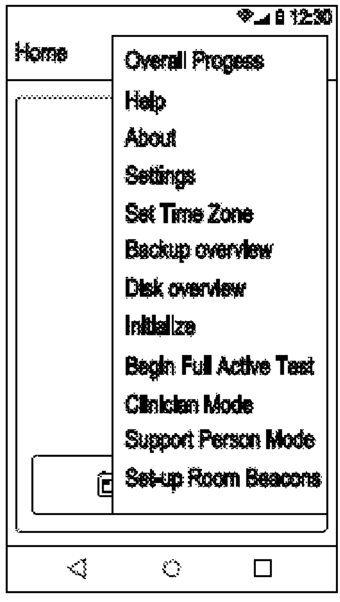
FIGS. 3A-3J depict screenshots of a mobile application according to one more illustrative aspects described herein.
Figure 3:
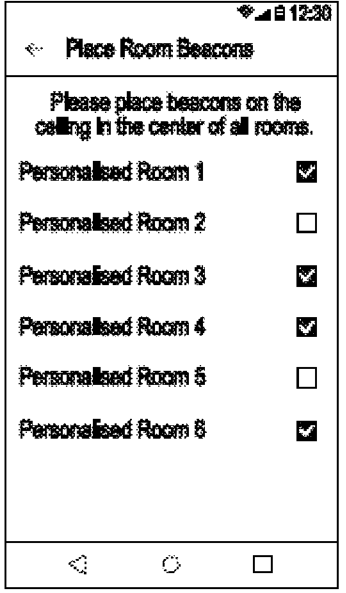
Figure 3:
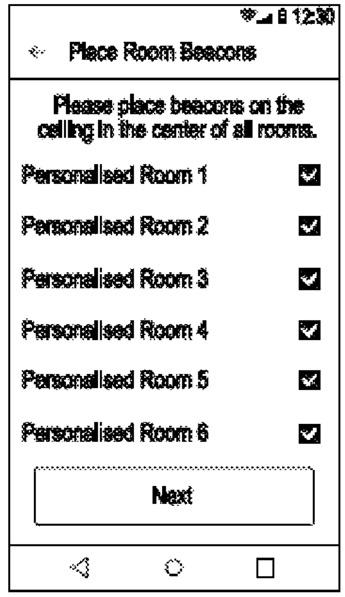
Figure 3:
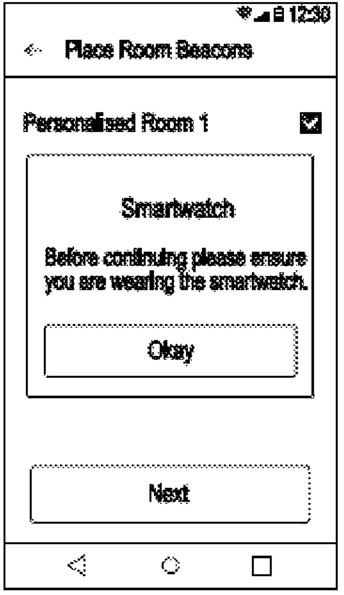
Figure 3:
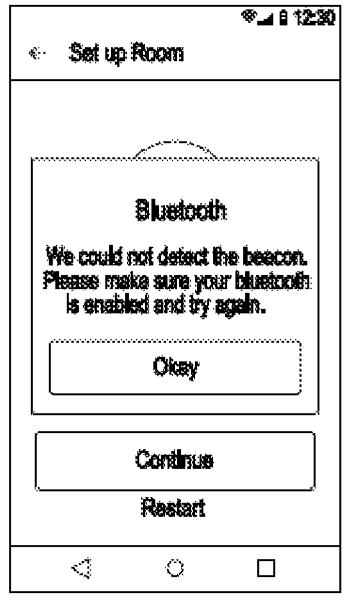
Figure 3:
Figure 3:
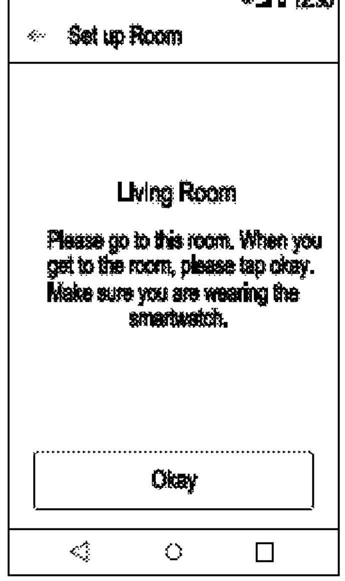
Figure 3:
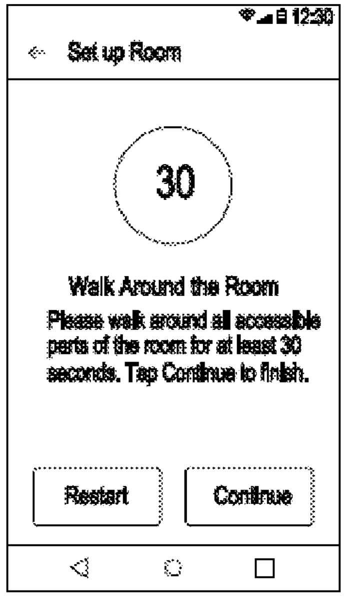
Figure 3:
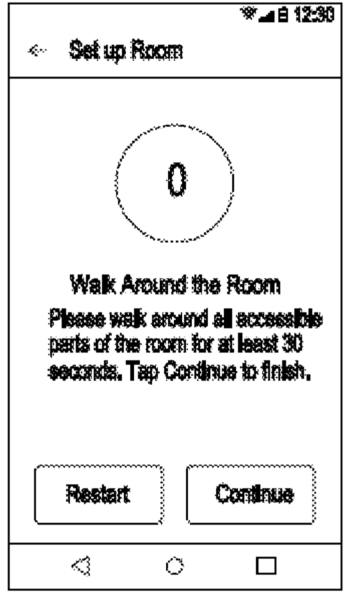
Figure 3:

Multiple beacon transmitting devices 102 (e.g., one BLE beacon for each room), and a receiving device 109 (e.g., one smartwatch) can enable in-home room tracking of a specific subject. Different vendor defined protocols for BLE beacon sensors—iBeacon and Eddystone—may be used. With reference to FIG. 1 and for purposes of illustration herein, FIG. 2 shows the iBeacon sensor (kontakt.io smart Beacon) and smartwatch (Samsung Gear Sport) used in one example described herein in the context of a clinical trial, although different devices can alternatively be used. The iBeacon shown in FIG. 2 is composed of a Universally Unique Identifier (UUID), a major ID, a minor ID and the transmission power. The UUID can be used as an identification label for the beacon and the transmission power of all beacons can be set to the maximum value (7) to maximize the chance of receiving signal from the beacons even if there are obstacles in between the receiver and the iBeacon. Each iBeacon transmits a signal with their UUID at a frequency of 1 Hz.

Some previous attempts to use iBeacons for indoor tracking followed a calibration-based approach, to account for complex interference patterns, which is a laborious process that has to be repeated every time something changes in the environment (e.g., change of furniture placement). In the example described herein, a different approach with no signal calibration process for the iBeacons is taken. This makes the use of the technology by nonprofessionals (e.g., participants of a clinical trial) easier and still provides valuable insights. It was aimed to take into account all possible changes in environment in the daily processing of the signal, since all changes are always relative and affect all iBeacons in proximity.

No calibration also means that there is no ground truth information about where the sensors were deployed in the homes of the clinical study participants. Therefore, a technical validation study has been performed before the clinical trial firstly to ensure that the location-tracking algorithm could accurately predict the room location, and secondly to identify any potential challenges to be addressed.

System Setup

1) Validation Study with Healthy Volunteers

The technical validation study has been performed with 10 healthy volunteers in 10 different home setup environments and with 45 test runs. Multiple environments help to account for different setups because the layout of the rooms were different. Some homes might have open spaces combining the kitchen and living room for example, affecting the signal propagation. Moreover, the material the home is built of may differ. For example, brick walls cause much higher signal attenuation than dry walls. Finally, the perception of each participant on how to place the iBeacons in their home might be different and is a very important variable that needs to be tested.

The technical equipment as well as the instructions provided were identical between the clinical trial and the technical validation study. In addition, a smartphone application was developed guides participants wearing the smartwatch through each registered room. The application instructs the participants to stay/walk within each of the rooms for 30 seconds, as depicted in FIG. 3G-3J. This instruction was only executed in the technical validation study to establish ground truth location data to determine the accuracy of the algorithm.

2) Clinical Trial iBeacons were provided to caregivers and participants in an observational clinical trial ('A Study to Evaluate Scales for Repetitive and Restricted Behaviors in Children, Adolescents, and Adults with Autism Spectrum Disorder (ASD)' (NCT03611075), herein incorporated by reference). The study included 90 patients diagnosed with ASD and 45 healthy volunteers, including children, adolescents and adults.

Caregivers were given one iBeacon for each room of the participant's home and asked to classify each room as social, sometimes social or not social. With reference to the screenshots depicted in FIGS. 3A-3F, a dedicated smartphone application was developed for this study, where the clinician could register the rooms of each participant's home and assign each room to an iBeacon ID and its respective sociability classification as instructed by the caregiver. Each iBeacon was physically labeled with the room name (e.g. living room). Upon arriving home, the caregiver placed the iBeacons in the corresponding room of the home as the label indicated.

Along with the iBeacons, a wearable device was also provided (e.g., a smartwatch, a mobile phone and the like) with a preinstalled application that collects the received signal strength from all transmitting iBeacons in proximity, and transmits the signal data for analysis, e.g., to a smartphone for further transmission to a server, directly to the server, etc. Trial participants were asked to wear the smartwatch throughout the duration of the clinical trial during the day (starting from the moment they wake up and for the 6-10 hours of the smartwatch's battery life).

This setup allowed for determining the rooms in which each participant spent their time through the days of the trial, and possibly infer their sociability over time. The goal was to infer the amount of time people with ASD spend in social or non-social rooms throughout the day (which could be interpreted as a measure of sociability, as well as any routine behavior patterns observed in their everyday lives).

Signal Collection and Processing

The method for estimating the closest beacon and thereby implicitly the room the person is in comprises the following method steps, which, specifically, may be performed in the given order or a different order. It is further possible to perform two or more of the method steps fully or partially simultaneously. Further, one or more or even all of the method steps may be performed once or may be performed repeatedly, such as repeated once or several times. Further, the method may comprise additional method steps which are not listed.

The method comprises the following steps:

Obtain the raw beacon signal per beacon. If the beacon setup is coupled to a wearable device as receiving device, such as a smartwatch, obtain the raw beacon signal from the smartwatch or from a smartwatch recording app. Depending on the specific beacon type, the transmission frequency may be different, thus one may expect a different number of raw beacon signals transmitted per second per beacon type. For example the iBeacon used in one of the examples described herein has a transmission frequency of 1 Hz, i.e. one signal per second.

Resample the beacon signal with the beacon transmission frequency to account for any missing signal. Missing signals may be caused by beacon sensors in close proximity to each other, and/or due to signal collisions (i.e. when two or more devices attempt to transmit data over a network at the same time or are transmitting at the same time, trying to acquire the medium/channel simultaneously, resulting in no signal going through to the receiving device), and/or multipath (e.g. signal reflection) and attenuation depending on the layout and the material the building is built of Missing signals also occur when the receiving device (e.g. smartwatch) is out of range of the transmitting device (e.g. iBeacon). This happens if the two devices are too far away, or if there are too many or very dense obstacles in between them. These incidents may be frequent and persistent for example when thick concrete walls block signals from certain rooms, or more transitory due to the positioning of the participant in the room and/or other people blocking the line of sight between beacon and receiver. In this case, the missing signal time gaps, i.e. the time periods with no signal, of a certain beacon can be comparable with the signal time spans, i.e. the time periods with signal. Therefore certain beacon sensor locations could misclassify the room location (Table III). These issues cannot be overcome conclusively while using the present invention without introducing additional effort for the participants (calibration etc.), or without trained technical personnel performing beacon sensor setups for each participant.

Perform signal interpolation in missing signal time gaps below a predefined threshold. In one embodiment, the threshold is set to 5 minutes. In the context of the clinical trial as well as the technical validation study described herein, for example, the median missing signal time gap was 6-8.5 seconds, depending on the number of beacons per household. Additionally, it was estimated that on average, only 8.5-20% of the expected with the transmission frequency of 1 Hz per iBeacon was received. The interpolation may be performed with several techniques, comprising but not limited to linear interpolation, polynomial interpolation, piecewise constant interpolation, with or without sliding window. In one embodiment, a linear interpolation is performed with a 10-seconds sliding window.

Populate any remaining missing signal time gaps (i.e., time intervals equal to or longer than the predefined threshold with no signal) with a predefined constant value to indicate out of range/missing signal. In one embodiment, the constant value is set to −100 dB.

Smooth the beacon signal to reduce noise and discontinuities. The smoothing can be performed with different techniques, comprising but not limited to filtering, additive smoothing, kernel smoothing, moving average, exponential moving average, linear regression, exponential regression. In one embodiment, the smoothing is performed using a Gaussian filter, and in a further embodiment a Gaussian filter with window size of 90 sec.

Rescale the beacon signal to a predefined range, since the smoothing has the effect of reducing the signal amplitude. In one embodiment, wherein the predefined constant value used to populate missing signal time gaps meeting or above the predefined threshold is set to −100 dB, the rescaling range of [−100 dB, −20 dB] is set.

Normalize the beacon signal to make the signal comparable across beacons. The normalization can be performed for example by dividing each signal by its mean over a predefined period of time, for example the 24 hours of a day.

Compute for the beacon signal a weight defined within a predefined range to establish the closest beacon In one embodiment, the weight of each beacon signal is its normalized values divided by the sum of the normalized values over the predefined period of time, so that the weight ranges from 0 to 1. The weight so computed represents the probability that the person is in the room associated with the beacon. In an embodiment, the person can be localized in the room associated with the highest-weighted beacon. In another embodiment, the person can be localized in the room associated with the highest-weighted beacon only if the weight is above a certain threshold. If as an example there is a total of N beacons and one beacon weight is higher than pN=1/N, then this beacon indicates the room the person is in.

Compute and smooth the beacon signal derivative. The signal derivative allows to evaluate the changes in the beacon signal, thus allows to assess the actions of entering/exiting a room. The smoothing of the signal derivative, like the smoothing of the signal, can be performed with different techniques, comprising but not limited to filtering, additive smoothing, kernel smoothing, moving average, exponential moving average, linear regression, exponential regression. In one embodiment, the smoothing is performed using a Gaussian filter, in a further embodiment a Gaussian filter with window size of 90 sec.

The method further comprises the following steps to estimate the room location over a period of time in the time range of collected data:

Find for each time point the beacon signal (bi) with the maximum weight, and the maximum smoothed beacon signal amplitude.

If the weight of beacon bi is greater than the threshold 1/N, wherein N is the total number of beacons, and the beacon signal derivative is not zero, then beacon bi identifies the room the person is in. The non-zero derivative indicates that there is variation in the signal and therefore excludes missing signals replaced by a constant value, for example of −100 dB as described earlier.

Otherwise, the estimated room location could either be set to unknown (if only locations with high confidence are of interest), or to the room with the beacon with maximum unscaled smoothed signal (if locations with lower confidence are admitted to avoid gaps in the location estimation).

All time points and respective estimated locations corresponding to periods in which the participant was not wearing the wearable are filtered out. Accelerometer data can be analyzed to identify the time spans during which the participant was not wearing the wearable, by defining them for example as those during which the standard deviation of Euclidean norm was less than 0.04 $m/s^2$ for more than 30 min. This threshold is higher than the threshold used for smartphones, since the standard deviation of the background accelerometer signal is slightly higher in the wearable than the smartphone.

In an embodiment, for estimating the closest iBeacon and thereby implicitly the room the person is in, the entire received beacon signal on the smartwatch of each participant whenever they were wearing the smartwatch was collected and the following processing of the signal was performed:

Obtain the raw beacon signal per iBeacon from the smartwatch recording app.

Resample the beacon signal with frequency of 1 Hz to account for any missing values due collisions (i.e., when two or more devices attempt to transmit data over a network at the same time.) etc.

Perform linear interpolation per beacon on missing signal gaps below 5 minutes.

Fill in any remaining missing data (i.e., for longer intervals than 5 minutes) with −100 dB to indicate out of range/missing signal.

Smooth signal per iBeacon using a Gaussian filter with window size of 90 sec.

Rescale signal to the range of [−100 dB, −20 dB] per iBeacon.

Normalize signal by dividing each iBeacon signal by its mean over the whole day.

Compute the weight of each iBeacon (range of [0, 1]). The weight of each beacon is its normalized values per time point divided by the sum of the normalized values across all day. If we have in total N iBeacons and this weight is higher than pN=1/N then the person could actually be in the room with this specific iBeacon.

Compute and smooth the signal derivative per iBeacon using a Gaussian filter and a window of 90 seconds.

Each iBeacon's transmission frequency was set to 1 Hz (i.e., a signal per second). As expected, a high amount of missing signal was observed in practice due to the number of iBeacon sensors in close proximity to each other, signal collisions, multipath and attenuation. Moreover, the amount of missing signal and the gap between consecutive received signal measurements also depends on the materials the building is built of and the layout of the space that might encourage more signal collisions.

The data from the internal experiment with healthy volunteers and from the clinical trial with both people with ASD and healthy volunteers, indicated that the median gap length of signal that needed to be interpolated was 6-8.5 seconds, depending on the number of beacons per household. Additionally, we estimated that on average, we have received 8.5-20% of the data we would have expected with the theoretical receiving frequency of 1 Hz per iBeacon, validating that the more iBeacon devices in the household, the lower the percentage of received signal.

Once all this information is gathered, it is used to estimate the room location for each second in the time range that we have iBeacon data for, as follows:

Find the iBeacon (bi) with the maximum weight, and the maximum filtered beacon signal strength If the weight of iBeacon bi is greater than threshold pN, and the derivative is not zero, then the estimated room location is set to the room with bi. The non-zero derivative indicates that there is variation in the signal and therefore not missing and replaced by a static value of −100 as described earlier.

Otherwise, the estimated room location could either be set to unknown (if we are interested only in locations with high confidence), or if we want to avoid having gaps in our location estimation with lower confidence, then the estimated room location is set to the room with the iBeacon with maximum unscaled filtered signal. In our scenario, we are interested in having a continuous signal of room estimations, so we pick the latter approach.

Once we have a continuous estimation of room locations, we filter out all time points and respective estimated locations while the participant was not wearing the watch. To estimate the spans that the participant was wearing the smartwatch, we filtered out accelerometer data where the standard deviation of Euclidean norm was less than 0.04 m/s2 for more than 30 min, as during these spans smartwatches were likely not carried by the subjects. This threshold is higher than the threshold we used for smartphones, for the standard deviation of the background accelerometer signal is slightly higher than the smartphone.

Another technical challenge was missing data. A very common reason for missing data in any radio frequency technology is signal collisions. Collisions happen when more than one iBeacon are transmitting at the same time, trying to acquire the medium/channel simultaneously, resulting in no signal going through to the receiving device. In such cases, we interpolate missing signal values for a few seconds at a time and during our signal processing.

Missing values also occur when the receiving device (e.g., smartwatch) is out of range of the transmitting device (e.g., iBeacon). This happens if the two devices are too far away, or if there are too many or very dense obstacles in between them. These incidents may be frequent and persistent throughout the study when thick concrete walls block signals from certain rooms, or more transitory due to the positioning of the participant in the room and/or other people blocking the line of sight between beacon and receiver. These factors are out of our control and cannot be predicted. In this case, the missing values of a certain iBeacon are continuous and for longer periods compared to the signal collisions. Therefore certain beacon sensor locations could misclassify the room location (Table III). These issues cannot be overcome conclusively while using the proposed technology without introducing additional effort for the participants (calibration etc.), or without trained technical personnel performing beacon sensor setups for each participant.

Results

1) Validation Study with Healthy Volunteers

The data collected in the technical validation study has been used to assess the accuracy of the algorithm. The accuracy is defined as the percentage of seconds that the room location (defined by the ground truth data) agrees with the iBeacon room estimate (estimated by the algorithm) for each test run and has been estimated as a mean across the 45 test runs, across the average accuracy in the 10 home setups, and across the duration of the ground truth data collected.

In the analysis of the possible sources of error in the system, the number and percentage of occurrences across all identified sources of error have been explored, as well as the median error introduced in the room estimation prediction in seconds.

Figure 4:
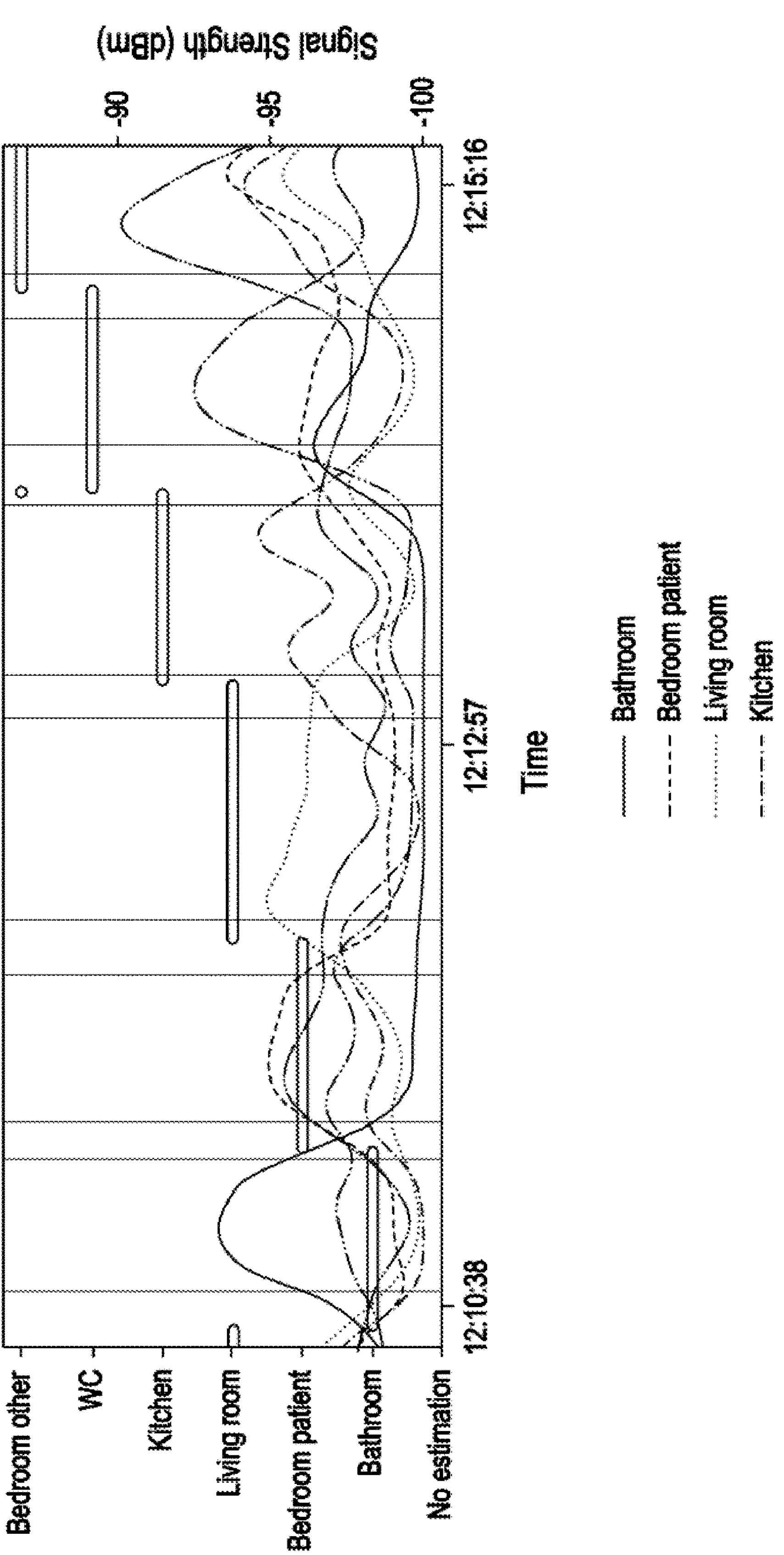
FIG. 4 illustrates an example visualization of test run number 13 from home setup 8 where the tracking algorithm has 100% accuracy. Ground truth location is indicated with the shaded background patches; recorded and pre-processed beacon data are indicated by the different curves linked to right y-axis signal strength in dB; line styles correspond to specific rooms as indicated by the legend; estimated room location is indicated by horizontal blue bars in line with the left y-axis.

In the technical validation study, across 10 home setups and 45 test runs, the average accuracy of the algorithm is 97.2%. In Table I, it is shown that for almost half of the test runs (44.4%) the algorithm had 100% accuracy, and for 92.2% of the runs the accuracy is over 98%. FIG. 4 shows a test run visualization (test run 13 from home setup 8), where the proposed algorithm had 100% accuracy. Ground truth location in FIG. 4 is indicated with the hatched background patches; recorded and pre-processed beacon data are indicated by the curves linked to right y-axis signal strength in dB; curve styles correspond to specific rooms as indicated by the legend; estimated room location is indicated by horizontal bars in line with the left y-axis. The signal strength of each corresponding beacon belonging to each room increases as the participant is entering the room, and decreases as the participant is leaving the room moving to the next one. Signal strength can also fluctuate while in the same room depending on how the participant moves, or if there are other people in the room moving through the line of sight between the sensor and the participant wearing the smartwatch.

Different setups had different numbers of rooms, as described in Table I. During this experiment a total of 208 rooms was tested, and only one of them was not identified by the proposed location tracking algorithm, suggesting 99.5% sensitivity of detecting a visited room. The total duration of ground truth information collected across all test runs was 7419 sec, and the total duration that rooms were misclassified is 248 sec; meaning that the accuracy based on runtime was 96.7%.

Moreover, the median accuracy across all the ten different environments was 98.3% (Table I). There was an outlier home setup with a much lower accuracy (i.e., home setup 4 with accuracy 69.8%) compared to the rest of the home setups. Looking more into the reasons that led to this poor performance for the home setup 4 (i.e., test runs 6 and 7 in Table I), it was found that the environment had very thin wooden walls. Therefore, the signal attenuation between the rooms due to the wall is very mild. Moreover, the participant placed the room iBeacons on the opposite sides of the same thin walls (i.e., the iBeacons are in very close proximity). With the very low signal attenuation (due to the thin wall), the signal of the two iBeacons is almost the same as if they were placed next to each other. The appropriate iBeacon placement would have been on external walls which allows maximum distance between iBeacons. That could correct for the almost non-existent signal attenuation due to the thin wall material. This is confirmed also by a finer breakdown of the impact of wall type and sensor placement on signal accuracy as shown in Table II.

Throughout all the test runs, three reasons for room misclassification were observed. Firstly, neighboring rooms. When entering a room, sometimes the previously visited room is still identified for a few seconds due to the short time between room transitions relative to the filtering window. Examples of this kind of error could be from a room that was previously visited as part of the experiment, or a walk through room during room transition. Secondly, incorrect setup is another important source of error. For example, when two physically neighboring rooms have very thin walls and the iBeacons are placed very close to the opposite sides of the same wall, then there can be room misclassification. Finally, erroneous ground truth data: e.g., user forgets to stop the ground truth recording before moving to the next room. The frequency and effect of these errors on the algorithm is summarized in Table III.

Results showed that on average up to approximately 10 seconds of erroneous room estimation per identified room might be expected. However, in the context of the described clinical trial application, only room visits that are longer than a few minutes are interesting to describe sociability. Therefore, the algorithm error of 10 seconds (Table III) is acceptable.

2) Clinical Trial

The feasibility of beacon setup in 87 of the participants in the clinical trial ('A Study to Evaluate Scales for Repetitive and Restricted Behaviors in Children, Adolescents, and Adults with Autism Spectrum Disorder (ASD)' (NCT03611075)) has been assessed. The participants/caregivers received all iBeacons for their home in one box. If the participant was wearing the smartwatch when all the iBeacons were still in the original box as provided by the clinician, then the received beacon signal would be very similar (same signal trends) across the different iBeacons, because they were all the same distance from the receiving device (i.e., smartwatch). On the other hand, if the iBeacons were separated (i.e., one in each room), then the signal received from each iBeacon should have different trends. Signal separation indicated that 84 study participants (96.5%) out of the 87 set up the iBeacons with one in each room on the first day of wearing the smartwatch, indicating it is feasible for participants to set up the technology without any guidance from a technical person.

Figure 5:
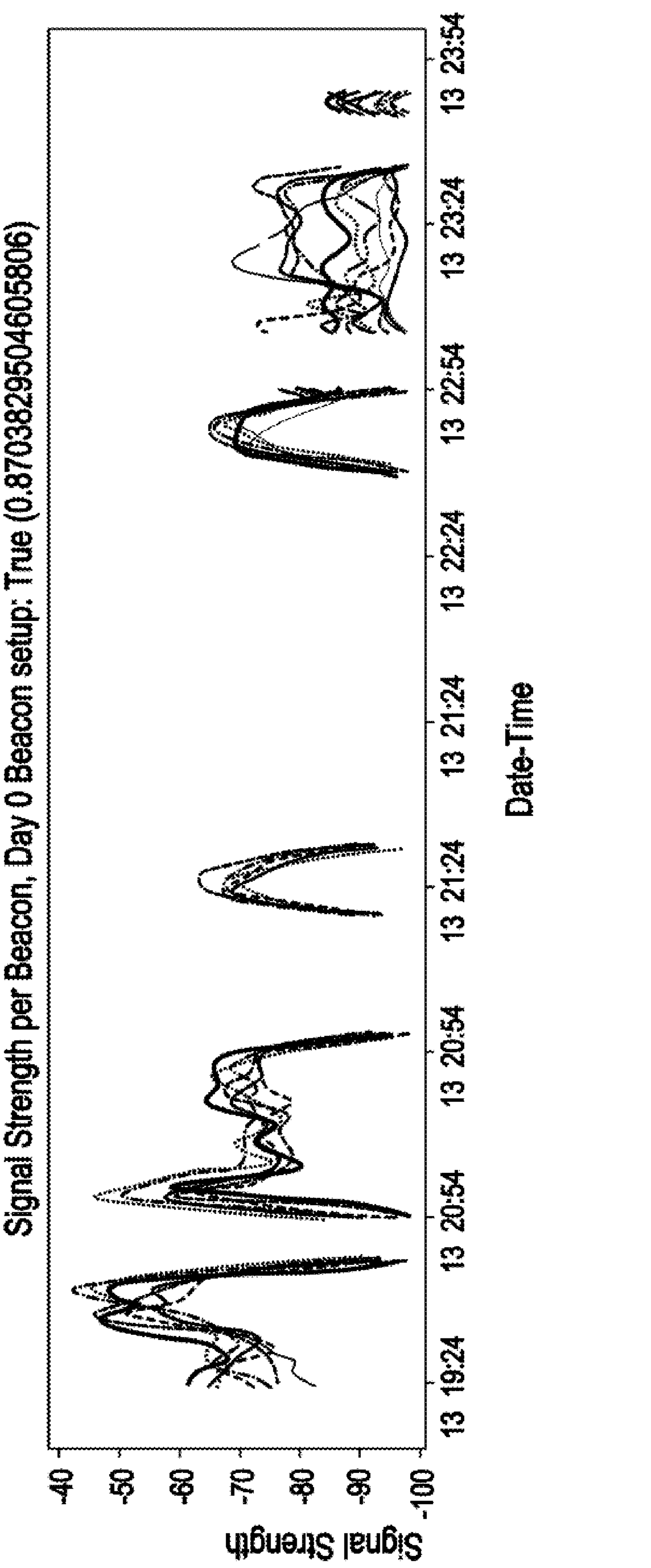
FIG. 5 illustrates that signals of different iBeacons follow the same trend on the 13th of the month until around 23:00, indicating that they are in the original box provided by the clinician. After 23:00 signals have different trends indicating that iBeacons are set up in different rooms.

FIG. 5 presents an example of beacon signal throughout a day. All beacon signals followed the same trend until 23:00 indicating that all beacons were at the same location and distance from the watch (i.e., most likely in the original box of equipment provided by the clinician). After 23:00 different beacon signals had different trends, indicating that they were set up each one in a different room (different distances from the watch).

In an embodiment, the room and sociability location estimation per participant in the study accounts for the everyday socializing patterns of the patient. In the following examples relating to two patients with ASD (FIGS. 6 and 7), one-week long location is depicted (room and sociability estimation) starting from a Monday during the study to the following Sunday. Each hatching in the room estimation figures indicates a different room of the household. In the sociability estimation figures, each hatching indicates the sociability level (e.g., not social, sometimes social and social) of the corresponding room the participant was in. There are three extra common labels for both room and sociability estimation figures (namely, Watch Off, No Beacons, and Unknown Room). 'Watch off' indicates that the participant was not wearing the watch. 'No beacons' label indicates that the participant was wearing the watch, but has no registered beacon in close proximity (i.e., maybe outdoors), and 'Unknown room' that the participant was at home in the proximity of beacon signal, but the algorithm could not estimate the room the participant was in with confidence.

Figure 6A:
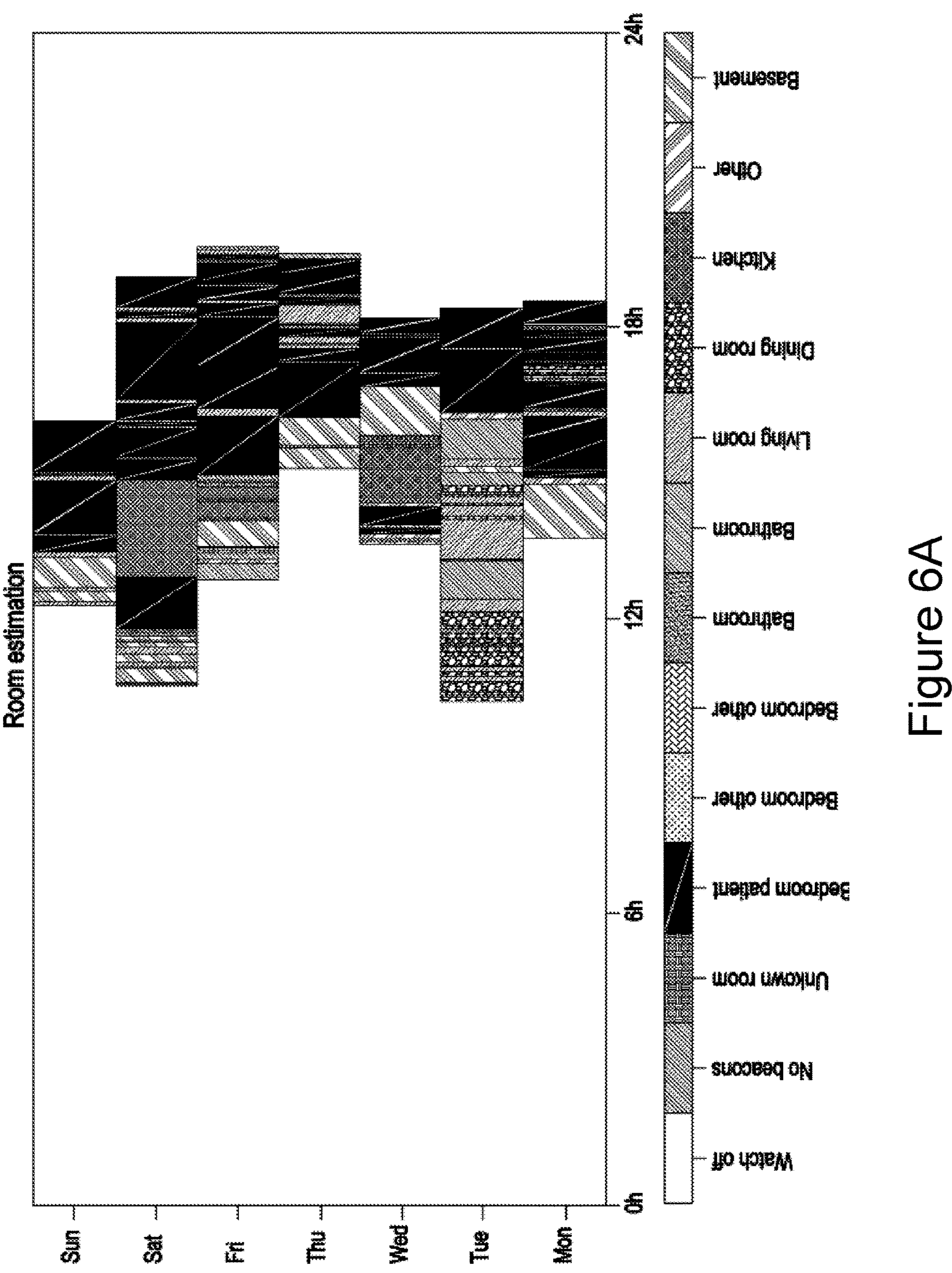
FIGS. 6 and 7 illustrate one-week long room (6A, 7A) and sociability (6B, 7B) estimations during the study, from a Monday to a Sunday, for two different participants with ASD. 'Watch off' indicates that the participant was not wearing the watch; 'No beacons' that the participant has no registered beacon in the proximity wearing the watch, maybe outdoors; 'Unknown room' that the participant was at home, but the algorithm could not estimate the room the participant was in with confidence.
Figure 6B:
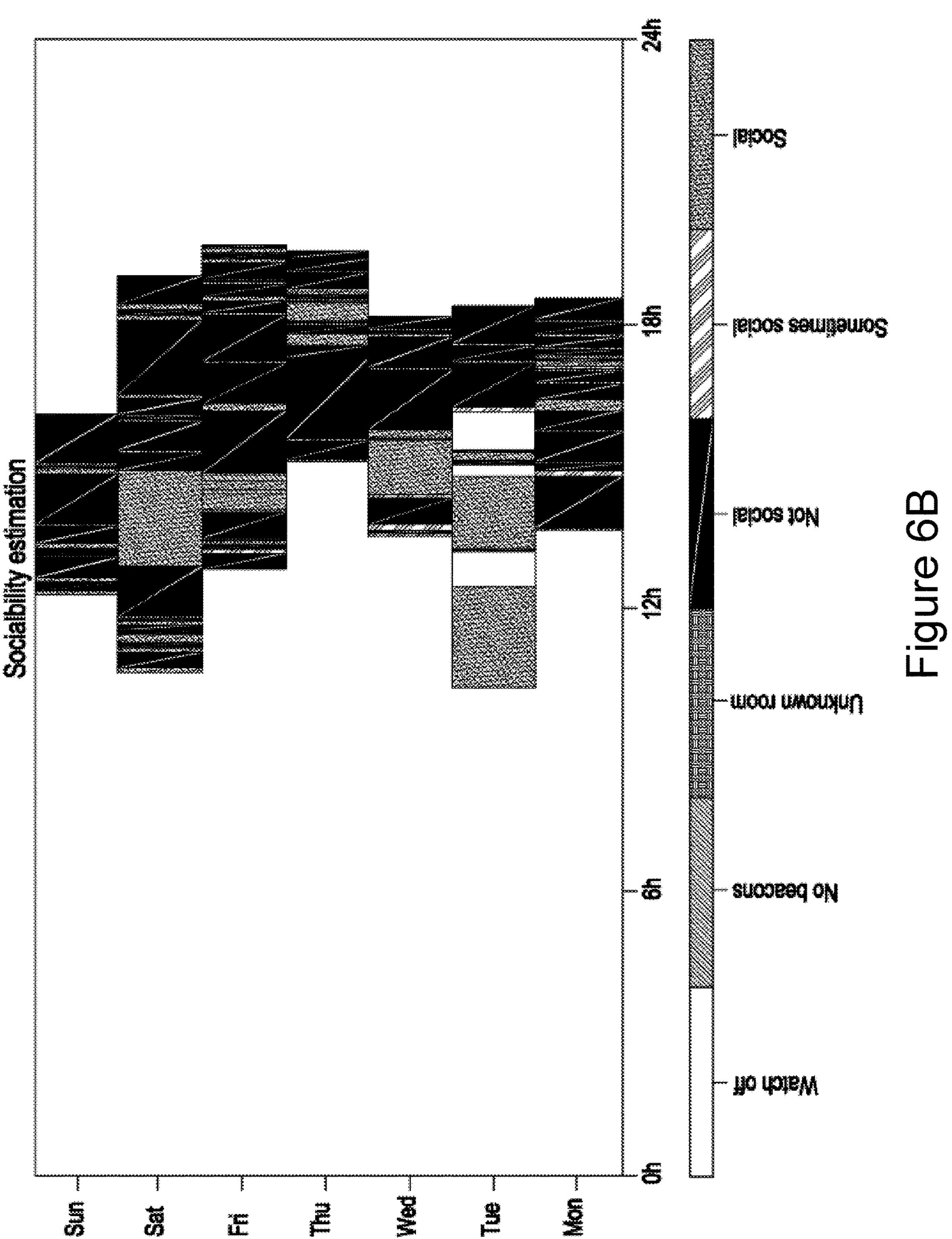

The participant with ASD shown in FIG. 6 spends most time in non-social rooms of the house (i.e., the bedroom or the basement). The participant spent mostly short time intervals in social areas like the living room and another unlabeled room, and larger chunks of time in social areas in late afternoon and even longer on Saturday.

Figure 7A:
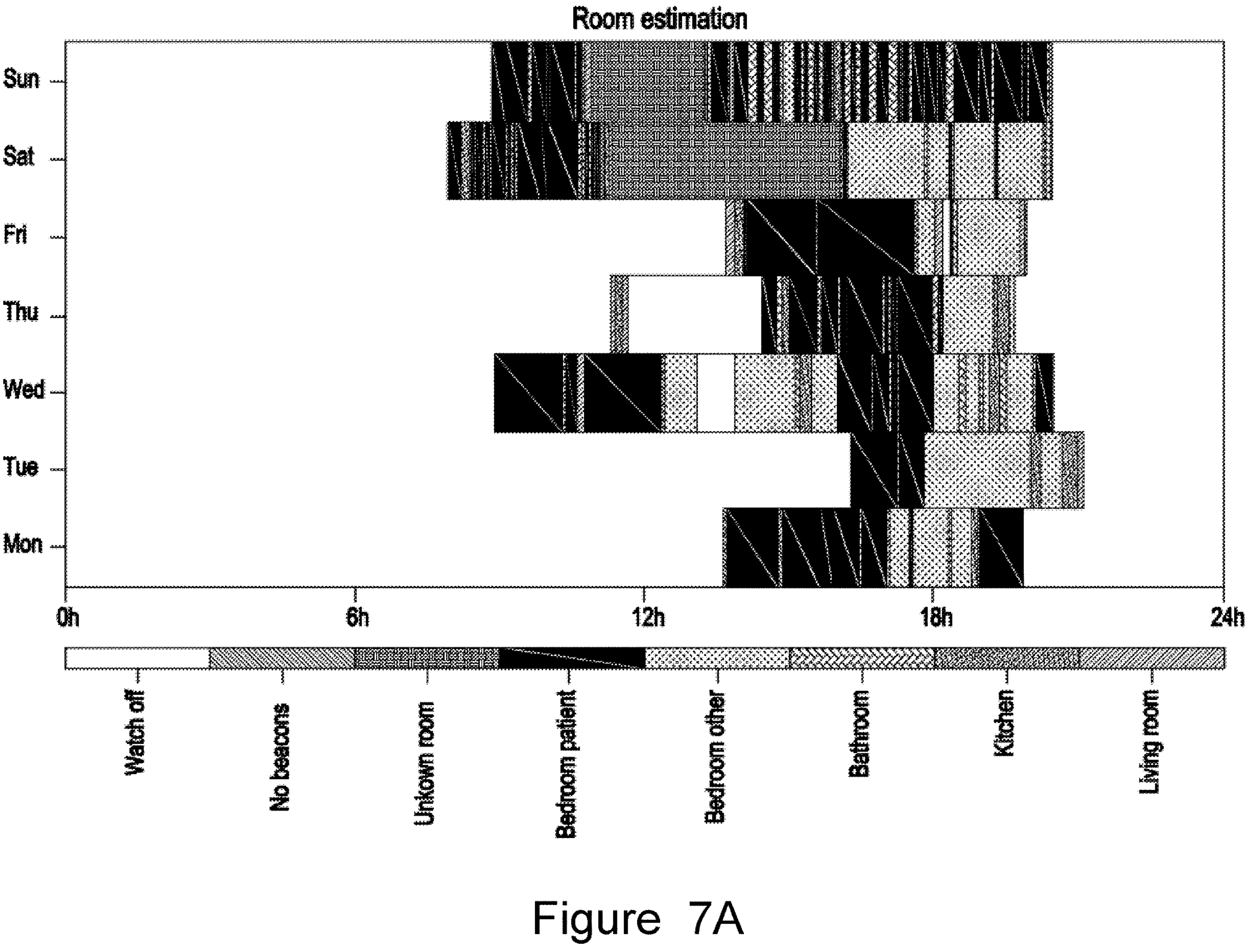
Figure 7B:
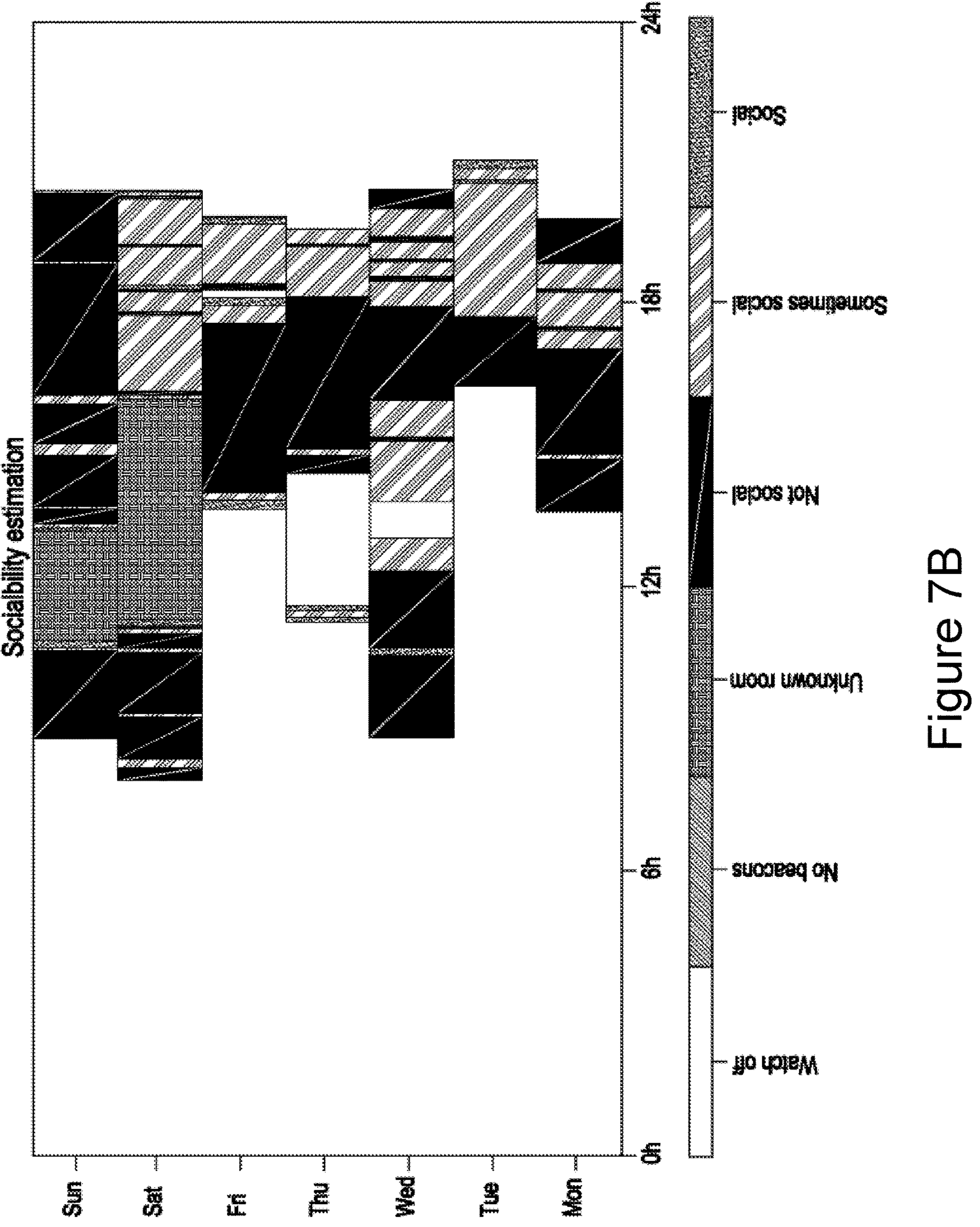

Another participant with ASD spent most of the time in non-social rooms like their bedroom or bathroom (FIG. 7). The participant spent short time intervals in social rooms like the living room, and has the pattern of spending time in the evening in another bedroom than their own. The participant left the house during lunchtime and early afternoon in the weekend wearing the watch, unlike the weekdays.

1. In an embodiment, a method for detecting a location of a receiving device is disclosed, said method comprising:

determining a raw beacon signal from each of a plurality of beacons, wherein each of the plurality of beacons is associated with a different room of a structure;

resampling any beacon signature as needed to a common frequency among all beacon signals;

linearly interpolating a signal value for each beacon during missing signal gaps below a predefined threshold;

populating missing signal gaps meeting or above the predefined threshold with a predefined value;

smoothing a signal of each beacon;

rescaling the signal of each beacon within a predefined range;

normalizing the signal of each beacon by dividing each beacon signal by its corresponding mean value over a predefined period of time;

determining, for each beacon signal, a weight within a predefined range;

compute a signal derivative using a Gaussian filter;

determining a particular beacon signal having a maximum weight, and the maximum filtered beacon signal strength; and setting a location to the room corresponding the particular beacon signal when the weight of the particular beacon signal is greater than a predetermined threshold and the derivative is not zero.

2. In an embodiment, the method of embodiment 1. is disclosed, wherein the common frequency is 1 Hz.

3. In an embodiment, the method of embodiment 1. is disclosed, wherein the missing signal gap predefined threshold is 5 minutes.

4. In an embodiment, the method of embodiment 1. is disclosed, wherein smoothing the signal of each beacon comprises using a Gaussian filter with window size of 90 sec.

5. In an embodiment, the method of embodiment 1. is disclosed, wherein the predefined range for rescaling the signal of each beacon is from −100 to −20 dB.

6. In an embodiment, the method of embodiment 1. is disclosed, wherein the predefined period of time is an entire day.

7. In an embodiment, the method of embodiment 1. is disclosed, wherein each signal weight is determined by its normalized values per time point divided by the sum of the normalized values across all day.

8. In an embodiment, the method of embodiment 1. is disclosed, wherein computing the signal's derivative comprises using a window of 90 seconds for the Gaussian filter.

9. In an embodiment, the method of embodiment 1. is disclosed, wherein each room is associated with a social score.

10. In an embodiment, the method of embodiment 9. is disclosed, further comprising:

monitoring a location of a person within the structure over a period of time; and assessing a social behavior metric of the person based on the social score of each room in which the user was detected over the period of time.

11. In a further embodiment, a method for detecting a location of a receiving device at a defined point in time is disclosed, said method comprising:

for each of a plurality of beacons, wherein each of the plurality of beacons is associated with a different room of a structure:

obtaining a raw beacon signal;

resampling the raw beacon signal to a frequency common to all of the plurality of beacons;

interpolating, in missing signal time gaps below a predefined threshold, the resampled beacon signal;

populating the missing signal time gaps meeting or above the predefined threshold;

smoothing the interpolated and populated beacon signal;

determining, for the smoothed beacon signal, a weight within a predefined range;

computing and smoothing the smoothed beacon signal derivative;

determining, among the plurality of smoothed beacon signals, the smoothed beacon signal having the maximum weight and the maximum signal amplitude at the defined point in time; and identifying the location of the receiving device at the defined point in time as the room associated with the determined beacon signal.

12. In an embodiment, the method of embodiment 11. is disclosed, wherein the step of identifying the location of the receiving device at the defined point in time further comprises:

identifying the location of the receiving device at a defined point in time as the room associated with the determined beacon signal, if the weight of the determined beacon signal is greater or equal than a predetermined threshold and the derivative of the determined beacon signal is not zero; and identifying the location of the receiving device at a defined point in time as the room associated with the beacon having maximum unscaled unsmoothed signal amplitude or by labelling the location as unknown, if the weight of the determined beacon signal is smaller than a predetermined threshold or the derivative of the determined beacon signal is zero.

13. In an embodiment, the method of embodiments 11-12 is disclosed, further comprising the steps of:

rescaling the smoothed beacon signal within a predefined range;

normalizing the rescaled beacon signal by dividing each beacon signal by its corresponding mean value over a predefined period of time.

14. In an embodiment, the method of any of embodiments 11-13 is disclosed, wherein the common frequency is 1 Hz.

15. In an embodiment, the method of any of embodiments 11-14 is disclosed, wherein the missing signal time gap predefined threshold is 5 minutes.

16. In an embodiment, the method of any of embodiments 11-15 is disclosed, wherein smoothing the beacon signal comprises using a Gaussian filter with window size of 90 sec.

17. In an embodiment, the method of any of embodiments 11-16 is disclosed, wherein the predefined range for rescaling the beacon signal is from −100 to −20 dB.

18. In an embodiment, the method of any of embodiments 11-17 is disclosed, wherein the predefined period of time is the 24 hours of a day.

19. In an embodiment, the method of any of embodiments 11-18 is disclosed, wherein the weight is determined by the normalized beacon signal per time point divided by the sum of the normalized beacon signal across all day.

20. In an embodiment, the method of any of embodiments 11-19 is disclosed, wherein smoothing the beacon signal derivative comprises using a Gaussian filter with window size of 90 sec.

21. In an embodiment, a method for a time-dependent estimation of a location of a receiving device is disclosed, said method comprising any of the methods of embodiments 11-20, performed at different time points.

22. In an embodiment, the method of any of embodiments 11-21 is disclosed, wherein each room is associated with a social score.

23. In an embodiment, the method of embodiment 22 is disclosed, further comprising: assessing a social behavior metric of the person based on the social score of each room in which the user was detected over the period of time.

24. In an embodiment, a system for executing the method of any of the preceding embodiments is disclosed, the system comprising:

a plurality of beacons, in particular Bluetooth Low Energy (BLE) beacons;

a wearable device, in particular a smartwatch;

wherein the wearable device is configured to receive one or more signals from the plurality of beacons.

25. In an embodiment, a system for executing the method of any of the embodiments 1-23 is disclosed, the system comprising:

a plurality of beacons;

a wearable device;

wherein the wearable device is configured to receive one or more signals from the plurality of beacons.

26. In an embodiment, a system for executing the method of any of the embodiments 1-23 is disclosed, the system consisting of:

a plurality of beacons, in particular Bluetooth Low Energy (BLE) beacons;

a wearable device, in particular a smartwatch;

wherein the wearable device is configured to receive one or more signals from the plurality of beacons.

27. In an embodiment, a system for executing the method of any of the embodiments 1-23 is disclosed, the system consisting of:

a plurality of beacons;

a wearable device;

wherein the wearable device is configured to receive one or more signals from the plurality of beacons.

28. In an embodiment, the use of the system of any of embodiments 24-27 and/or of the method of any of the preceding embodiments to perform in-home room tracking is disclosed, in particular for patients, more particularly patients with ASD.

29. In an embodiment, the use of the system of embodiment 24-27 and/or of the method of any of the preceding embodiments to perform in-home room tracking is disclosed.

30. In an embodiment, the use of the system of any of embodiments 24-27 and/or of the method of any of the preceding embodiments to perform in-home room tracking is disclosed, in particular for patients.

All embodiments herein disclosed can be combined.

CONCLUSIONS

In the described embodiments, BLE beacon technology for indoor passive location tracking has been applied in the context of a clinical trial. Innovations identified include, firstly, that this is the first time that BLE beacon data was collected as part of a clinical trial, and where people with no relevant training had to set up such technology without the supervision of a technical person. Secondly, that the BLE beacon technology within home monitoring has the potential to provide deep longitudinal insights about the in-home behavior and sociability of study participants in an objective manner, which may overcome shortcomings of subject questionnaire-based measures that are frequently used in ASD and related conditions. Finally, the hardware deployed in each room being a low-cost consumer BLE beacon sensor instead of a specialized device not available to the public yet allows the present invention to be practical, reliable in monitoring the study participant across the whole house and easily deployable. The room-tracking algorithm of the present invention identified the correct room the study participant was in with 97.2% accuracy in the technical validation study, no matter how many other people are present in the same room. Moreover, it is feasible to deploy this technology in a clinical trial without any technical assistance or calibration/training data collection. Participants were adherent with early set up of the BLE beacon sensors (96% of them performing it on the first day). Beacon room tracking in clinical trials could provide insights into the patients' everyday sociability patterns. The systems of the present invention, as any real world technology deployment, comes with certain hurdles that must be overcome. The possibility of obtaining reliable ground truth information for each participant's home setup in a clinical trial setup by a technical person would be impractical and constrained by retaining patient privacy (as an alternative would be placing cameras in their different rooms). Moreover, Table III shows possible scenarios that may reduce the accuracy of a BLE beacon based system for behavior monitoring. To minimize their impact on accurate room estimation, solutions have been identified that can minimize any possible error due to the home environment. Firstly, BLE beacon sensors should be set to have the same transmission power. Secondly, BLE beacon sensors should be placed in an open area in each room that is close to the activity center of the room. Finally, BLE beacon sensors should ideally have line of sight and face toward the participant (e.g., do not place behind books) and not considerably higher than the receiving device (e.g., smartwatch). This is a set of good practice guidelines for using BLE beacon technology in the future.

BLE beacon-based features can be used to identify meaningful associations with clinical markers related to sociability in the context of ASD. Possible BLE beacon-based features comprise: the number of room transitions during the day or per hour; the number and/or percentage of rooms visited in a day; the number and/or percentage of social sometimes social or not social rooms in a day; the ratio of average percentage of staying in social and non-social rooms; the time and/or percentage of time spent in social, sometimes social or not social areas in a day; the time and/or percentage of time spent at home, i.e. in proximity of room beacons; the average and/or median duration of staying in all, social, sometimes social or not social rooms. Valid information can be derived by monitoring all the above mentioned features in variations based on: the times of the day, e.g. morning, afternoon, evening; if more family members or people are in proximity; if restrictive and repetitive behaviours happened in the monitored rooms; what was the anxiety level of the persons in the monitored rooms. From a pilot study performed with data collected between 12:00 and 22:00, the following features stand out as the most promising ones: ratio of average percentage of staying in social and non-social rooms; average percentage of the day spent in non-social rooms; average percentage of rooms visited in a day.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

TABLE I

Home setups in internal study with healthy volunteers, number of rooms (matching the number of iBeacons deployed in each home setup), and room estimation accuracy results for different home setups, including wall type and iBeacon location in the rooms.

| Home setup | Number of rooms | Test run | Test run accuracy (%) | Mean setup accuracy (%) | Wall type | iBeacon location in room |
|---|---|---|---|---|---|---|
| 1 | 3 | 1-2 | 97.9, 100 | 98.9 | Concrete | By external walls |
| 2 | 5 | 3-4 | 97.7, 99 | 98.4 | Thin | Center |
| 3 | 7 | 5 | 92.8 | 92.8 | Thin | Center |
| 4 | 6 | 6-7 | 69.4, 70.3 | 69.8 | Thin | By shared walls |
| 5 | 5 | 8-9 | 93.9, 96.4 | 95.2 | Concrete | Center |
| 6 | 4 | 10 | 99.2 | 99.2 | Thin | By external walls |
| 7 | 4 | 11 | 91.4 | 91.4 | Thin | Center |
| 8 | 6 | 12-17 | 96.2, 100, 100, 100, 97.3, 100 | 98.9 | Concrete | Center |
| 9 | 4 | 18-38 | 97.7, 100, 100, 100, 97.7, 100, 100, 100, 100, 99.4, 100, 98.5, 99.4, 100, 97.7, 97.9, 100, 98, 100, 100, 100 | 99.3 | Concrete | Center |

TABLE II

Impact of wall type and sensor placement on accuracy during internal study.

| Wall type | iBeacon location in room | Number of home setups | Mean accuracy (%) |
|---|---|---|---|
| Concrete | — | 5 | 98.1 |
| Thin | — | 5 | 90.3 |
| — | Center | 7 | 96.3 |
| — | By external walls | 2 | 99.1 |
| — | By shared walls | 1 | 69.8 |

TABLE III

Summary of sources of error during internal study.

| Reason for room misclassification | Number of occurrences | Percentage of occurrences out of all sources of error | Median error per room estimation |
|---|---|---|---|
| Previously visited as part of the test run | 13 | 33.3% | 2 sec |
| Next visited as part of the test run | 11 | 28.2% | 2 sec |
| Walk by/through room during room transition | 6 | 15.4% | 1 sec |
| Neighboring rooms have very thin walls & iBeacons not in the center of each room | 4 | 10.3% | 11 sec |
| Error with start/end ground truth recorder | 5 | 12.8% | 5 sec |

What is claimed:

1. A method for detecting a location of a receiving device at a defined point in time, said method comprising:

for each of a plurality of beacons, wherein each of the plurality of beacons is associated with a different room of a structure:

obtaining a raw beacon signal;

resampling the raw beacon signal to a frequency common to all of the plurality of beacons;

interpolating, in missing signal time gaps below a predefined threshold, the resampled beacon signal;

populating the missing signal time gaps meeting or above the predefined threshold;

smoothing the interpolated and populated beacon signal;

determining, for the smoothed beacon signal, a weight within a predefined range;

computing and smoothing the smoothed beacon signal derivative;

determining, among the plurality of smoothed beacon signals, the smoothed beacon signal having the maximum weight and the maximum signal amplitude at the defined point in time; and identifying the location of the receiving device at the defined point in time as the room associated with the determined beacon signal.

2. The method of claim 1, wherein the step of identifying the location of the receiving device at the defined point in time further comprises:

identifying the location of the receiving device at a defined point in time as the room associated with the determined beacon signal, if the weight of the determined beacon signal is greater or equal than a predetermined threshold and the derivative of the determined beacon signal is not zero; and identifying the location of the receiving device at a defined point in time as the room associated with the beacon having maximum unscaled unsmoothed signal amplitude or by labelling the location as unknown, if the weight of the determined beacon signal is smaller than a predetermined threshold or the derivative of the determined beacon signal is zero.

3. The method of claim 1, further comprising the steps of rescaling the smoothed beacon signal within a predefined range;

normalizing the rescaled beacon signal by dividing each beacon signal by its corresponding mean value over a predefined period of time.

4. The method of claim 1, wherein the frequency common to all of the plurality of beacons is 1 Hz.

5. The method of claim 1, wherein the missing signal time gap predefined threshold is 5 minutes.

6. The method of claim 1, wherein smoothing the beacon signal comprises using a Gaussian filter with window size of 90 sec.

7. The method of claim 1, wherein the predefined range for rescaling the beacon signal is from −100 to −20 dB.

8. The method of claim 1, wherein the predefined period of time is the 24 hours of a day.

9. The method of claim 1, wherein the weight is determined by the normalized beacon signal per time point divided by the sum of the normalized beacon signal across all day.

10. The method of claim 1, wherein smoothing the beacon signal derivative comprises using a Gaussian filter with window size of 90 sec.

11. The method of claim 1 performed at second defined time point.

12. The method of claim 1, wherein each room is associated with a social score.

13. The method of claim 12, further comprising:

assessing a social behavior metric of the person based on the social score of each room in which the user was detected over the period of time.

14. A system for executing the method of claim 1, the system comprising:

a plurality of beacons, in particular Bluetooth Low Energy (BLE) beacons; and a wearable device, in particular a smartwatch;

wherein the wearable device is configured to receive one or more signals from the plurality of beacons.

15. The use of the system of claim 14 to perform in-home room tracking, in particular for patients, more particularly patients with ASD.

* * * * *